US012664280B1

(12) United States Patent
Jain

(10) Patent No.: US 12,664,280 B1
(45) Date of Patent: Jun. 23, 2026

(54) ENHANCED AGENT-BASED FILE INTEGRITY MONITORING

(71) Applicant: Amazon Technologies, Inc., Seattle, WA (US)

(72) Inventor: Rajnish Jain, Gurugram (IN)

(73) Assignee: Amazon Technologies, Inc., Seattle, WA (US)

( * ) Notice: Subject to any disclaimer, the term of this patent is extended or adjusted under 35 U.S.C. 154(b) by 14 days.

(21) Appl. No.: 18/783,774

(22) Filed: Jul. 25, 2024

(51) Int. Cl.
*G06F 21/56* (2013.01)

(52) U.S. Cl.
CPC ................................. *G06F 21/567* (2013.01)

(58) Field of Classification Search
CPC ........ G06F 21/567; G06F 21/55; G06F 21/57; G06F 2221/034; G06F 21/53; G06F 21/565; G06F 2009/45562
See application file for complete search history.

(56) References Cited

U.S. PATENT DOCUMENTS

| | | | | |
|---|---|---|---|---|
| 11,036,606 B2 * | 6/2021 | Larkin | ................ | G06F 11/3089 |
| 11,849,000 B2 * | 12/2023 | Williams | .............. | H04L 67/535 |
| 11,930,045 B1 * | 3/2024 | Baker | ................ | H04L 63/0245 |
| 12,034,754 B2 * | 7/2024 | O'Hearn | ............ | G06F 16/9024 |
| 12,111,940 B1 * | 10/2024 | Durand | ................... | G06F 9/545 |
| 12,143,398 B1 * | 11/2024 | Durand | ................ | H04L 63/107 |
| 12,253,910 B2 * | 3/2025 | Merchant | ........... | G06F 11/3065 |
| 12,323,468 B2 * | 6/2025 | Baker | ................... | H04L 63/101 |
| 12,355,626 B1 * | 7/2025 | Varakantam | ........... | G06F 9/455 |
| 12,367,281 B2 * | 7/2025 | Boutnaru | .............. | G06F 21/568 |

OTHER PUBLICATIONS https://ebpf.io/what-is-ebpf/; eBPF Summit 2024, What is eBPF? An Introduction and Deep Dive into the eBPF Technology, 2024, 20 pages.

* cited by examiner

*Primary Examiner* — Hosuk Song
(74) *Attorney, Agent, or Firm* — Eversheds Sutherland (US) LLP

(57) ABSTRACT

Devices, systems, and methods for agent-based file integrity monitoring (FIM). A method may include using a FIM daemon in a device's user space that works in concert with sandboxed FIM machine code in the kernel space of the device. The FIM machine code may define event-based triggers for notifying the user space when a file modification occurs in the kernel space, and when the user space detects a reported file modification based on the defined event triggers, the user space may report the file modification to a control plane that serves multiple devices.

18 Claims, 5 Drawing Sheets

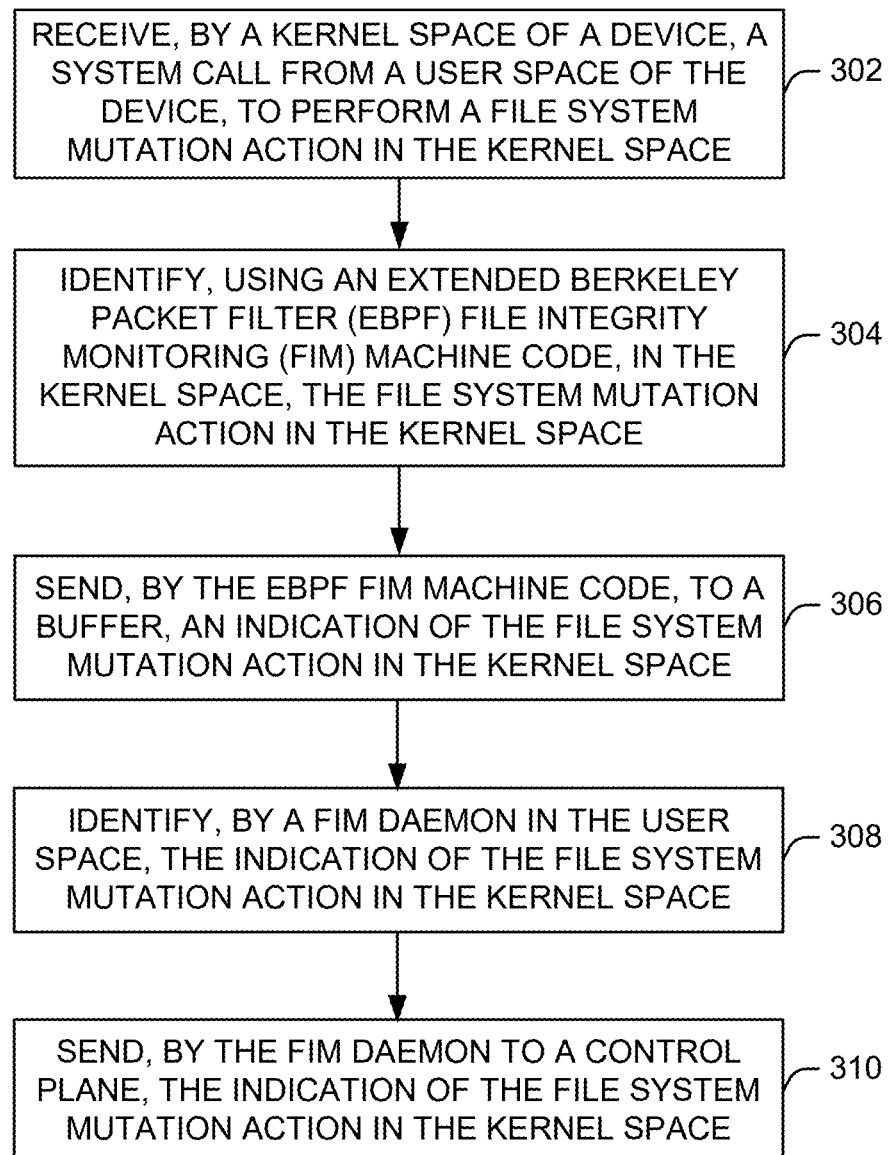

RECEIVE, BY A KERNEL SPACE OF A DEVICE, A SYSTEM CALL FROM A USER SPACE OF THE DEVICE, TO PERFORM A FILE SYSTEM MUTATION ACTION IN THE KERNEL SPACE — 302

IDENTIFY, USING AN EXTENDED BERKELEY PACKET FILTER (EBPF) FILE INTEGRITY MONITORING (FIM) MACHINE CODE, IN THE KERNEL SPACE, THE FILE SYSTEM MUTATION ACTION IN THE KERNEL SPACE — 304

SEND, BY THE EBPF FIM MACHINE CODE, TO A BUFFER, AN INDICATION OF THE FILE SYSTEM MUTATION ACTION IN THE KERNEL SPACE — 306

IDENTIFY, BY A FIM DAEMON IN THE USER SPACE, THE INDICATION OF THE FILE SYSTEM MUTATION ACTION IN THE KERNEL SPACE — 308

SEND, BY THE FIM DAEMON TO A CONTROL PLANE, THE INDICATION OF THE FILE SYSTEM MUTATION ACTION IN THE KERNEL SPACE — 310

FIG. 3

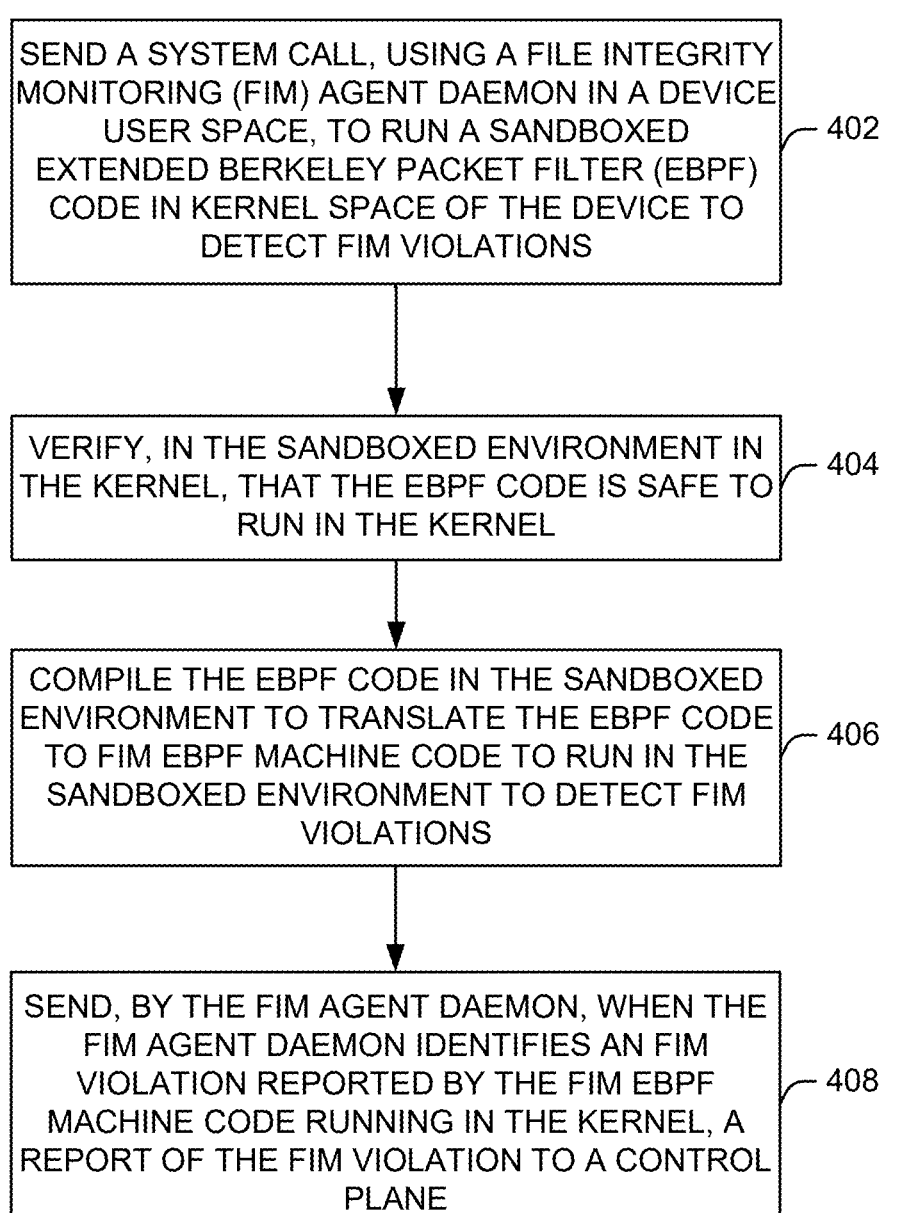

400

SEND A SYSTEM CALL, USING A FILE INTEGRITY MONITORING (FIM) AGENT DAEMON IN A DEVICE USER SPACE, TO RUN A SANDBOXED EXTENDED BERKELEY PACKET FILTER (EBPF) CODE IN KERNEL SPACE OF THE DEVICE TO DETECT FIM VIOLATIONS — 402

VERIFY, IN THE SANDBOXED ENVIRONMENT IN THE KERNEL, THAT THE EBPF CODE IS SAFE TO RUN IN THE KERNEL — 404

COMPILE THE EBPF CODE IN THE SANDBOXED ENVIRONMENT TO TRANSLATE THE EBPF CODE TO FIM EBPF MACHINE CODE TO RUN IN THE SANDBOXED ENVIRONMENT TO DETECT FIM VIOLATIONS — 406

SEND, BY THE FIM AGENT DAEMON, WHEN THE FIM AGENT DAEMON IDENTIFIES AN FIM VIOLATION REPORTED BY THE FIM EBPF MACHINE CODE RUNNING IN THE KERNEL, A REPORT OF THE FIM VIOLATION TO A CONTROL PLANE — 408

502 — HARDWARE PROCESSOR
524 — INSTRUCTIONS

510 — GRAPHICS DISPLAY DEVICE

512 — INPUT DEVICE

504 — MAIN MEMORY
524 — INSTRUCTIONS

514 — UI NAVIGATION DEVICE

506 — STATIC MEMORY
524 — INSTRUCTIONS

516 — STORAGE DEVICE
522 — MACHINE-READABLE MEDIUM
524 — INSTRUCTIONS

518 — SIGNAL GENERATION DEVICE

520 — NETWORK INTERFACE

519 — FIM MODULES

530 — ANTENNA(S)

532 — POWER DEVICE

508

534 — OUTPUT CONTROLLER

526 — COMMUNICATIONS NETWORK

ENHANCED AGENT-BASED FILE INTEGRITY MONITORING

BACKGROUND

File integrity monitoring is a security technique for monitoring and analyzing integrity of computer assets, and can detect illicit activities and unintended changes on file systems. File integrity monitoring in the kernel space has been challenging, often requiring changes to kernel source code or load custom kernel modules, risking kernel health, undermining network deployment, and introducing operational challenges due to diverse kernel variants deployed in large networks.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 3 is a flow for an example process for agent-based FIM, in accordance with one or more embodiments of the present disclosure.

FIG. 4 is a flow for an example process for loading code of the agent-based FIM of FIG. 3 in a kernel space, in accordance with one or more embodiments of the present disclosure.

Figure 1:
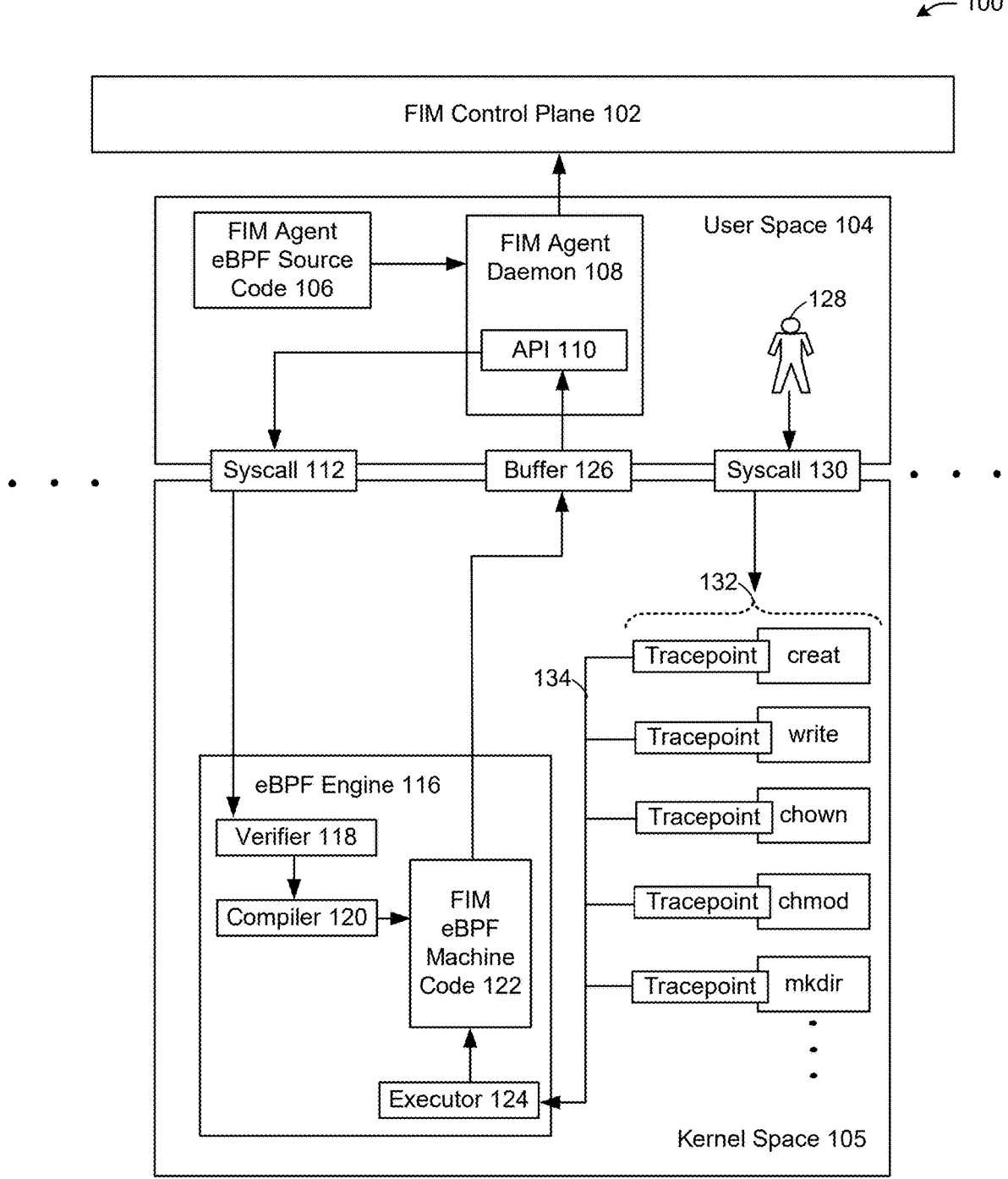
FIG. 1 illustrates an example architecture for a file integrity monitoring (FIM) agent, in accordance with one or more embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Overview

Example embodiments described herein provide certain systems, methods, and devices for enhanced file integrity monitoring (FIM).

FIM (also known as file integrity checking) is a security hardening mechanism for server workloads. FIM detects illicit activity and pinpoints unintended changes on server filesystems. For example, FIM may detect a cyberattack on a server and unapproved software modifications in software deployment (e.g., in a production server) that may undermine trust in the server in which the software is deployed. The eBPF (extended Berkley Packet Filter) is a recent addition in mainstream operating system (OS) kernels (e.g., Linux and Windows) that enables kernel space programming without requiring to change kernel source code or load kernel modules. eBPF works on the principle of a sandboxed runtime that assures safety of the kernel and efficiency of the user program in kernel space.

A server in this context may represent any form of compute associated with a file system. A server can be any of physical hardware, virtualized server, container, function-as-a-service, or the like. A file system can be a locally attached optical disk, solid-state medium, or a remotely-mounted networked filesystem connected, such as over Network File System (NFS) or Common Internet File System (CIFS) protocols.

Existing FIM methods work as OS user space programs. The FIM problem space is about detecting unauthorized mutations to the file system, and better aligns with kernel space logic because the entire file system needs to be monitored as opposed to user space logic, which concerns with individual programs (PIDs—process identifiers). The kernel has visibility into all file system mutation operations (e.g., file create, update, and delete performed by any user or kernel space program), and such events can be directly tapped from the kernel and processed for FIM analysis in a higher control plane.

Solving the FIM problem in kernel space has not been practical yet because the only alternatives were either to change kernel source code or load kernel modules. Both options are too risky for kernel health and impractical to deploy in networks containing millions of servers with a diverse set of kernel variants and versions. An eBPF is a kernel programming framework that Linux kernels and Windows kernels support and that can help solve the FIM problem efficiently.

However, user space programs are inefficient compared to kernel space programs when a fundamentally kernel space problem is being solved in user space. Multiple applications are converting previous user space designs into kernel space designs (e.g., that better map into kernel space) because eBPF has become available in some operating system (OS) kernels. The FIM user space solutions are based on periodic scanning of file systems. These are not only inefficient, but also have significant delays (e.g., several hours to multiple days) between the occurrence and detection of a FIM violation.

The kernel events-driven approach herein works in near real-time and will shorten such delays to a few seconds. Quicker detection can enable quicker response, containment and remediation of a FIM breach.

In one or more embodiments, the present disclosure proposes an enhanced method for solving the FIM problem that uses eBPF trace points to detect and filter file input/output (I/O) events in kernel space. An eBPF program is split into kernel space and user space components. The user space component of the FIM eBPF program may consolidate file I/O events from the kernel, perform further processing such as computing file hashes, and push them to a central control plane where FIM analysis is performed. The FIM control plane is responsible for reconciling file mutations with a Source of Truth (SoT), such as the software repositories populated by a build system and ticketing to a server owner.

FIM may be agent-based, meaning that an FIM agent may run on a host server (e.g., in the user space) and create a snapshot of files on the server (e.g., metadata). The snapshot may be used as a source of truth for a baseline, and may be run periodically to identify any changes to the server files. The user space may issue system calls to interact with the kernel. Currently, the user space collects file data from the kernel, which is slow and resource-intensive, and slows down the application. Also, the FIM currently performs the comparisons to the baseline for detecting unintended changes and illicit activity.

The approach used by the eBPF to run sandboxed programs in a privileged context like the kernel provides protection for the kernel by extending kernel capabilities without requiring changes to kernel source code or load kernel modules. The sandbox approach of eBPF avoids requiring a different, customized version of the kernel, and avoids the need to load kernel modules-both or which can be risky, sometimes resulting in undermining the kernel and crashing the server.

Instead of periodic snapshot comparisons, eBPF and eBPF-based implementation of FIM may use the kernel to monitor events that inform file modifications. In this manner, cBPF provides a more direct approach and reduces the delay time between the occurrence and the detection of the breach in comparison with the existing periodic snapshot approach. eBPF programs are event-driven and run when the kernel passes a "hook point," such as a system call, function entry or exit, kernel tracepoint, or the like. When the hook is identified, the cBPF program may be loaded into the kernel using a system call (e.g., passing verification to ensure that the program is safe to run, and passing a compilation to translate the program into machine instructions).

In one or more embodiments, the enhanced eBPF FIM techniques herein provide improved scalability, as reporting of events to the control plane may be limited to FIM violating events in the kernel, so the control plane resources are lighter and more scalable for a network.

In one or more embodiments, the FIM program may include a daemon that listens for changes reported from the kernel, and also may include eBPF machine code in the kernel. The cBPF code may define triggers for reporting violating FIM events to the control plane. When the FIM agent pushes an event to the control plane, the event reporting may include a string, a file name/file descriptor (FD), and a process identifier, along with a process executable name, to identify which process performed the modification. In this manner, the event reporting may signal to the control plane which file was modified and by which process.

In one or more embodiments, the control plane may be used by many servers. In this manner, any of multiple servers may look for different file paths, and may report FIM violations. In some embodiments, the FIM agent may be exposed to external users (e.g., via an application programming interface to access the FIM agent).

In one or more embodiments, by directly tapping into kernel and listening to the kernel for certain events as files are modified, then the initial snapshot and periodic comparisons to the snapshot can be avoided. In addition, because the snapshot monitoring is periodic so as to not be constantly slowing down an application, there can be a time delay between when an attack or other unwanted modification occurs and when it is detected. For example, if the periodic monitoring occurs every twelve hours, then there may be hours between the attack and when it is detected using current techniques. The enhanced techniques herein may detect the unwanted modification in near real-time, reducing the delay between occurrence and detection, and without slowing down an application in the way that the periodic monitoring does. Also, because the control plane may service many servers, the control plane may use a fleet of servers. By limiting reporting to the control plane to only FIM violating events, the enhancements herein are more scalable than existing techniques, as the control plane may be lighter and may service more servers.

The above descriptions are for purposes of illustration and are not meant to be limiting. Numerous other examples, configurations, processes, etc., may exist, some of which are described in greater detail below. Example embodiments will now be described with reference to the accompanying figures.

Illustrative Processes and Use Cases

FIG. 1 illustrates an example architecture 100 for a file integrity monitoring agent, in accordance with one or more embodiments of the present disclosure.

Referring to FIG. 1, the architecture 100 may represent an eBPF architecture for an FIM agent, and may include a control plan 102 in communication with multiple servers (or other devices), any of which may include a user space 104 and a kernel space 105. Source code 106 of an FIM agent (e.g., C-language eBPF program) may be delivered into the kernel space 105 by an FIM agent daemon 108 that may use an application programming interface (API) 110 (e.g., an API of a BPF compiler for compiling C-language code) to make a syscall 112 (e.g., system call to request a service) to the kernel space 105 to load an eBPF program into the kernel space 105. An eBPF engine 116 may use a verifier 118 to verify that the eBPF program is safe, and a compiler 120 to translate the bytecode of the eBPF program to FIM eBPF machine code 122. In this manner, the source code 106 may be run as the FIM eBPF machine code 122 in the kernel space 105. An executor 124 may trigger the reporting of a triggering action in the kernel space 105 to a buffer 126 (e.g., a ring buffer 126 or another type of eBPF map data structure such as hash tables or arrays between the user space 104 and the kernel 105), which may be monitored by the FIM agent daemon 108 for events indicative of an FIM violation.

Still referring to FIG. 1, a user in the user space 104 (e.g., a potential FIM violator) may make syscalls 130 (system calls) to the kernel space 105 in the performance of file system mutation actions 132 (e.g., creat, write, chown (change ownership), chmod (modify file permissions), mkdir (create a directory), and the like) A tracepoint may be set up by the FIM cBPF machine code 122 for any of the file system mutation actions 132 so that when one such action occurs, a trigger action 134 may be reported to the executor 124 listening to the kernel space 105 for triggering events. When a triggering event is detected, the FIM eBPF machine code 122 may report the event to the buffer 126 in real-time so that the FIM agent daemon 108 may detect and report the event in real-time to the control plan 102. The user space 104 and the kernel space 105 may represent a single server, and the control plane 102 may receive reported FIM violations from multiple servers, so the user space 105 and kernel space 105 may be present in multiple servers each reporting the control plane 102 when a respective FIM violating event is detected in the respective kernel space 105.

In one or more embodiments, the architecture 100 provides an enhanced method for solving the FIM problem that uses eBPF trace points to detect and filter file input/output (I/O) events in kernel space. An eBPF program is split into components in the kernel space 105 (e.g., the eBPF engine 116) and the user space 104 (e.g., the source code 106 and the FIM agent daemon 108). The FIM agent daemon 108 may consolidate file I/O events from the kernel space 105, perform further processing such as computing file hashes, and push them to the FIM control plane 102 where FIM analysis may be performed. The FIM control plane 102 may be responsible for reconciling file mutations and ticketing a server owner.

The eBPF machine code 122 may be event-driven and run when the kernel space 105 passes a "hook point" (e.g., the file system mutation actions 132). The FIM agent daemon 108 may listen for changes reported from the kernel space 105 (e.g., by listening to the buffer 126), and also may include the FIM eBPF machine code 122 in the kernel space 105. The FIM eBPF machine code 122 may define triggers for reporting violating FIM events to the FIM control plane 102. When the FIM agent daemon 108 pushes an event to the FIM control plane 102, the event reporting may include a string, a file name/file descriptor (FD), and a process identifier (PID). In this manner, the event reporting may signal to the FIM control plane 102 which file was modified.

The eBPF is delivered as a virtual machine in the eBPF engine 116 inside the kernel space 105. In this manner, the FIM eBPF machine code 122 runs inside the eBPF engine 116 as a sandbox. The compiler 120 natively compiles the FIM agent eBPF source code 106 (e.g., into the microprocessor represented by the kernel space 105), so the FIM agent eBPF source code 106 should be in a language supported by the compiler 120, such as C programming language. The FIM eBPF machine code 122 may create a tracepoint to any of the file system mutation actions 132 to detect certain types of events in the kernel space 105 that may be indicative of an FIM violation.

In one or more embodiments, the syscalls herein are not general function calls, but rather specific assembly instructions to establish information to identify the syscall and its parameters, to trigger a switch from user mode to kernel mode, and to retrieve the result of the system call. In Linux, syscalls are identified by numbers and parameters.

Figure 2:
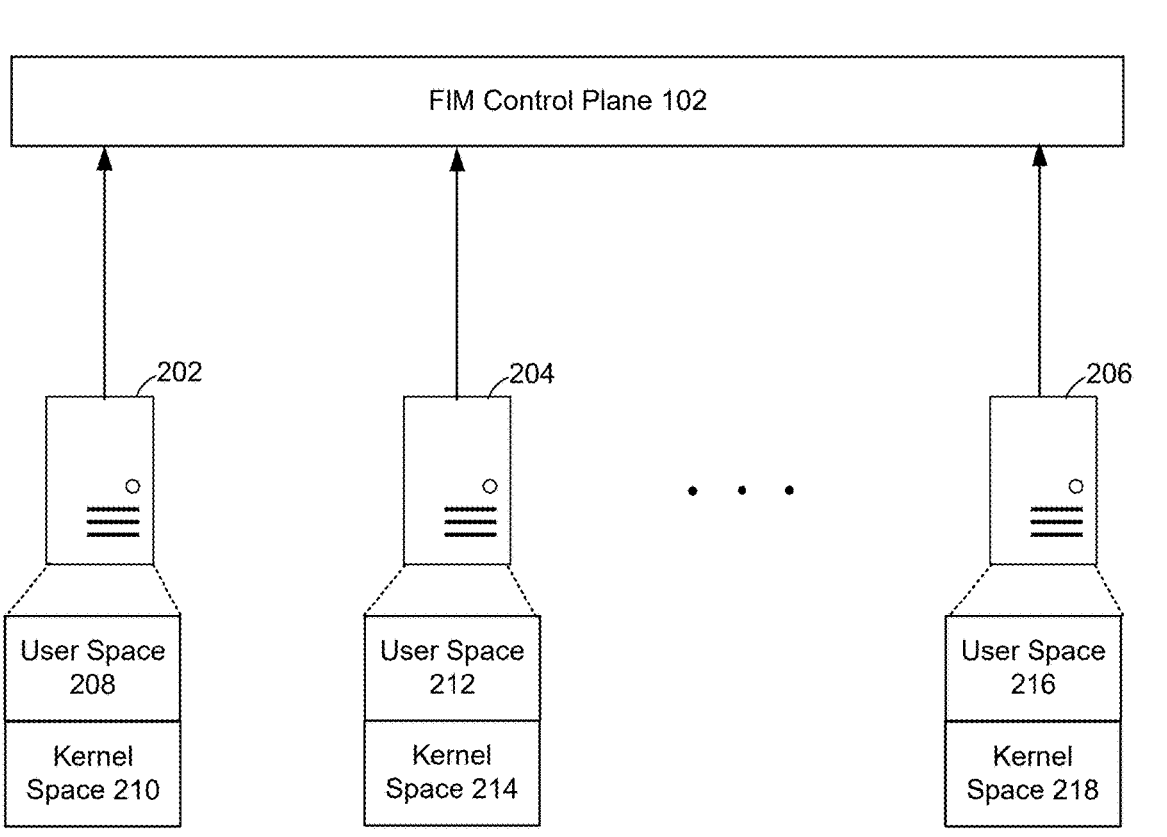
FIG. 2 illustrates an example architecture of the FIM control plane of FIG. 1 monitoring multiple servers, in accordance with one or more embodiments of the present disclosure.

FIG. 2 illustrates an example architecture 200 of the FIM control plane 102 of FIG. 1 monitoring multiple servers, in accordance with one or more embodiments of the present disclosure.

Referring to FIG. 2, the architecture 200 shows the architecture 100 of FIG. 1 with the multiple servers (e.g., server 202, server 204, . . . , server 206) that the FIM control plane 102 may be monitoring. In this manner, the architecture 200 represents an expanded view of the architecture 100 rather than different architecture. Any of the servers may have their own user space and kernel space (e.g., user space 208 and kernel space 210 of server 202, user space 212 and kernel space 214 of server 20, and user space 216 and kernel space 218 of server 206), which may use the FIM agent as shown in FIG. 1 (e.g., to monitor events in the kernel space).

In one or more embodiments, any of the servers may monitor different files and file paths in their respective kernel spaces. In this manner, the FIM eBPF machine code 122 may include some default trigger events and/or file paths to monitor on any server, and any server may have additional/different trigger events for different file paths in their respective kernel. For example, any of the servers may have different source code packages with different file paths, so the FIM eBPF machine code 122 may be customized per server to define the file paths for trigger events in a given server. In some embodiments, the FIM agent of FIG. 1 may be available as a service to any of the servers 202-206, with the tracepoints optionally being configurable for different users and their respective files.

Referring to FIGS. 1 and 2, instead of periodically running the snapshot of existing techniques on the servers and using resources of the servers, the FIM agent operates in real-time, but using fewer resources because it only signals FIM-violating events based on the triggers rather than providing the snapshot of the many files of the servers to the FIM control plane 102. In the snapshot approach, many of the files reported in the snapshot may have no FIM violation, so many resources may be wasted in the reporting to allow the FIM control plane 102 to detect a FIM violation based on the snapshot. The FIM agent approach herein is lighter and less resource intensive, and reduces the delay time between FIM event and detection and reporting.

Referring to FIGS. 1 and 2, a server or other device with the user and kernel spaces may represent any form of compute associated with a file system. A server can be any of physical hardware, virtualized server, container, function-as-a-service, or the like. A file system can be a locally attached optical disk, solid-state medium, or a remotely-mounted networked filesystem connected, such as over NFS or CIFS protocols. In this manner, the eBPF file monitoring may apply to local files or to files on attached hardware (e.g., network hardware).

Still referring to FIGS. 1 and 2, a user space daemon may collect and batch send kernel events to control plane 102 as opposed to sending the events one-by-one, which may optimize performance. One-by-one event reporting has the advantage of near-real-time. However, if some reporting delay were tolerated, the user space daemon may collect small batches (e.g., events it gets in last x minutes), and then send one message to the control plane that includes the events collected in the time window. Batch reporting is a network and control plane scalability optimization technique. The buffer 126 may achieve this because multiple events from the kernel may be buffered, and the daemon then collects them at once.

FIG. 3 is a flow for an example process 300 for agent-based FIM, in accordance with one or more embodiments of the present disclosure.

At block 302, a device (or system, e.g., the servers 202-206 of FIG. 2) may receive, by a kernel space (e.g., the kernel space 105 of FIG. 1), a syscall (e.g., the syscall 130) from a user space (e.g., the user space 104) of the device to perform a file system mutation action (e.g., of the file system mutation actions 132) in the kernel space. File system mutation actions may include mutations to a directory (e.g., as a specify type of file).

At block 304, the device may identify, using an eBPF FIM machine code (e.g., the FIM cBPF machine code 122 of FIG. 1), running in a sandbox in the kernel space, the file system mutation action in the kernel space. The eBPF machine code may run in the kernel space because a daemon (e.g., the FIM agent daemon 108 of FIG. 1) may make a syscall from the user space to run the eBPF code in the kernel space, resulting in verification and compiling of the eBPF code to translate to the FIM eBPF machine code. The FIM eBPF machine code may define tracepoints for various file system mutation actions in the kernel space that, when detected, trigger the FIM eBPF machine code 122 to store a record of the qualifying modification for access by the user space.

At block 306, the device may use the eBPF FIM machine code to send the record of the file system mutation action to a buffer (e.g., the buffer 126) to be accessed by the user space. In this manner, only the triggering events indicative of file system mutations defined by the eBPF code may be sent to the user space rather than a periodic snapshot of all file mutations. As a result, instead of all file mutations from the kernel space needing FIM analysis, the FIM violation may be detected first, triggering the reporting from the kernel space based on the monitoring of the sandboxed eBPF in the kernel space.

At block 308, the device may identify, using the daemon in the user space may listen to the buffer and may identify the indication of the file system mutation action as reported by the eBPF in the kernel space.

At block 310, the device may send, using the FIM daemon, to a control plane (e.g., the control plane 102), the indication of the file system mutation action in the kernel space. In this manner, rather than a snapshot of all file modifications in the kernel space being reported to the control plane to identify FIM violations, the FIM violations may be identified based on the file systems mutation criterion in the eBPF code, and reported to the control plane based on a detected FIM violation.

FIG. 4 is a flow for an example process 400 for loading code of the agent-based FIM of FIG. 3 in a kernel space, in accordance with one or more embodiments of the present disclosure.

At block 402, a device (or system, e.g., the servers 202-206 of FIG. 2) may send a syscall (e.g., the syscall 112 of FIG. 1) to run a sandboxed eBPF code in kernel space (e.g., the kernel space 105) to monitor the kernel for unwanted file systems mutations. For example, FIM agent cBPF source code in the user space may include a FIM agent daemon with an API for making the syscall and monitoring for FIM violations detected by the eBPF code in the kernel.

At block 404, the device may verify, in the sandboxed environment (e.g., the cBPF engine 116) in the kernel, that the eBPF code is safe to run in the kernel, such as whether the loading of the eBPF code in the kernel has proper permissions, that the code runs to completion, that the code meets size requirements, that the code does not access impermissible resources, and the like.

At block 406, the device may compile, in the sandboxed environment, the cBPF code to translate the cBPF code to FIM eBPF machine code (e.g., the FIM eBPF machine code 122). The cBPF code should be written in a C-language or other programming language supported by the compiler 120, so the compiler 120 may be a BCC or other C-language compiler. The FIM cBPF machine code may define tracepoints for file system mutations in the kernel space that, when detected in the kernel space, may be reported to a buffer (e.g., the buffer 126), to which the FIM agent daemon for detection of such mutations that are indicative of FIM violations.

At block 408, when an FIM violation is detected by the FIM agent daemon, the FIM agent daemon may report the FIM violation to a control plane (e.g., the control plane 102).

The examples herein are not meant to be limiting.

Figure 5:
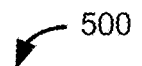
FIG. 5 illustrates a block diagram of an example machine upon which any of one or more techniques (e.g., methods) may be performed, in accordance with one or more example embodiments of the present disclosure.

FIG. 5 illustrates a block diagram of an example machine upon which any of one or more techniques (e.g., methods) may be performed, in accordance with one or more example embodiments of the present disclosure.

In other embodiments, the machine 500 may operate as a standalone device or may be connected (e.g., networked) to other machines. In a networked deployment, the machine 500 may operate in the capacity of a server machine, a client machine, or both in server-client network environments. The machine 500 may be a server, a personal computer (PC), a smart home device, a tablet PC, a personal digital assistant (PDA), a mobile telephone, a wearable computer device, a web appliance, a network device, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine 500 (e.g., computer system) may include a hardware processor 502 (e.g., a central processing unit (CPU), a graphics processing unit (GPU), a hardware processor core, or any combination thereof), a tensor processing unit (TPU), a main memory 504 and a static memory 506, some or all of which may communicate with each other via an interlink (e.g., bus 508). The machine 500 may further include a power device 532, a graphics display device 510, an input device 512 (e.g., a keyboard), and a user interface UI navigation device 514 (e.g., a mouse). In an example, the graphics display device 510, input device 512, and UI navigation device 514 may be a touch screen display. The machine 500 may additionally include a storage device 516, a signal generation device 518, one or more FIM modules 519 (e.g., representing the FIM agent eBPF source code 106, the FIM agent daemon 108, and the eBPF engine 116 of FI. 1 and capable of performing the process 300 of FIG. 3 and the process 400 of FIG. 4), and a network interface 520 coupled to antenna(s) 530. The machine 500 may include an output controller 534, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 516 may include a machine-readable medium 522 on which is stored one or more sets of data structures or instructions 524 (e.g., software) embodying or utilized by any one or more of the techniques or functions described herein. The instructions 524 may also reside, completely or at least partially, within the main memory 504, within the static memory 506, or within the hardware processor 502 during execution thereof by the machine 500. In an example, one or any combination of the hardware processor 502, the main memory 504, the static memory 506, or the storage device 516 may constitute machine-readable media.

While the machine-readable medium 522 is illustrated as a single medium, the term "machine-readable medium" may include a single medium or multiple media (e.g., a centralized or distributed database, and/or associated caches and servers) configured to store the one or more instructions 24.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 500 and that cause the machine 500 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 524 may further be transmitted or received over a communications network 526 using a transmission medium via the network interface 520 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 602.11 family of standards known as Wi-Fi®, IEEE 602.16 family of standards known as WiMax®), IEEE 602.15.4 family of standards, and peer-to-peer (P2P) networks, among others. In an example, the network interface 520 may include one or more physical jacks (e.g., Ethernet, coaxial, or phone jacks) or one or more antennas to connect to the communications network 526. The term "transmission medium" shall be taken to include any intangible medium that is capable of storing, encoding, or carrying instructions for execution by the machine 500 and includes digital or analog communications signals or other intangible media to facilitate communication of such software.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in any applicable flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in any flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A method for agent-based file integrity monitoring, the method comprising:
   generating, using a file integrity monitoring (FIM) daemon in a user space of a device, a first system call to run an extended Berkeley Packet Filter (eBPF) FIM agent in a kernel space of the device;
   generating, by a compiler in the kernel space, a translation of source code of the eBPF FIM agent to eBPF FIM machine code defining tracepoints of file system mutation actions in the kernel space, wherein the file system mutation actions include one or more of a file create, a file write, a file delete, a file change of ownership, or a modification of file permissions or any file attributes;
   receiving, by the kernel space, a second system call, from the user space, to perform one of the file system mutation actions in the kernel space;
   identifying, by the eBPF FIM machine code, in the kernel space, based on one of the tracepoints, the one of file system mutation actions in the kernel space;
   sending, by the eBPF FIM machine code, to a buffer, an indication of the one of file system mutation actions in the kernel space;
   identifying, by an application programming interface (API) of the FIM daemon in the user space, the indication of the one of file system mutation actions in the kernel space; and
   sending, by the FIM daemon to a FIM control plane of multiple devices comprising the device, the indication of the one of file system mutation actions in the kernel space.

2. The method of claim 1, wherein the eBPF FIM machine code runs in a sandboxed engine within the kernel space based on the first system call.

3. The method of claim 1, wherein the eBPF FIM machine code defines event-based triggers for reporting the file system mutation actions to the buffer, and wherein the eBPF FIM machine code sends the indication of the one of file system mutation actions to the buffer based on the identifying of the one of file system mutation actions as one of the event-based triggers.

4. The method of claim 1, wherein the indication of the one of file system mutation actions is included in a batch report of multiple file system mutations identified by the eBPF machine code during a time period for the batch report.

5. A method for agent-based file integrity monitoring, the method comprising:

receiving, by a kernel space of a device, a system call, from a user space of the device, to perform a file system mutation action in the kernel space, wherein the file system mutation action is one of a file create, a file write, a file delete, a file change of ownership, or a modification of file permissions or any file attributes;

identifying, by an extended Berkeley Packet Filter (eBPF) file integrity monitoring (FIM) machine code, in the kernel space, the file system mutation action in the kernel space;

sending, by the eBPF FIM machine code, to a buffer, an indication of the file system mutation action in the kernel space;

identifying, by a FIM daemon in the user space, the indication of the file system mutation action in the kernel space, wherein the eBPF FIM machine code runs in the kernel space based on the FIM daemon; and sending, by the FIM daemon to a control plane of multiple devices comprising the device, the indication of the file system mutation action in the kernel space.

6. The method of claim 5, wherein the eBPF FIM machine code runs in a sandboxed engine within the kernel space based on the first system call.

7. The method of claim 5, wherein the eBPF FIM machine code defines event-based triggers for reporting file system mutation actions to the buffer, and wherein the eBPF FIM machine code sends the indication of the file system mutation action to the buffer based on the identifying of the file system mutation action as one of the event-based triggers.

8. The method of claim 5, wherein the indication of the file system mutation action is included in a batch report of multiple file system mutations identified by the eBPF machine code.

9. The method of claim 5, further comprising:

generating, using the FIM daemon in the user space, a second system call to run the eBPF FIM agent in a kernel space of the device.

10. The method of claim 5, wherein the FIM daemon delivers FIM eBPF source code in the user space to the kernel space, the method further comprising:

generating, by a compiler in the kernel space, a translation of the FIM eBPF source code to the eBPF FIM machine in the kernel space.

11. The method of claim 5, wherein the one or more system file mutation actions occurs in a remotely-mounted network file system.

12. The method of claim 5, wherein the eBPF FIM machine code defines file mutation actions for the device that are different than second file mutation actions defined by a second eBPF FIM machine code deployed in a kernel space of a second device that reports the second file mutation actions to the control plane.

13. A system for agent-based file integrity monitoring, the system comprising memory coupled to at least one processor, wherein the at least one processor is configured to:

a control plane in communication with server devices; and a first server of the server devices, the first server comprising a user space and a kernel space, wherein the first server is configured to:

receive, by the kernel space, a system call, from the user space, to perform a file system mutation action in the kernel space, wherein the file system mutation action is one of a file create, a file write, a file delete, a file change of ownership, or a modification of file permissions or any file attributes;

identify, by an extended Berkeley Packet Filter (eBPF) file integrity monitoring (FIM) machine code, in the kernel space, the file system mutation action in the kernel space;

send, by the eBPF FIM machine code, to a buffer, an indication of the file system mutation action in the kernel space;

identify, by a FIM daemon in the user space, the indication of the file system mutation action in the kernel space, wherein the eBPF FIM machine code runs in the kernel space based on the FIM daemon; and send, by the FIM daemon to a control plane of multiple devices comprising the device, the indication of the file system mutation action in the kernel space.

14. The system of claim 13, further comprising a second server of the server devices, wherein the second server is configured to:

receive, by a kernel space of the second server, a second system call, from a user space of the second server, to perform a file system mutation action in the kernel space of the second server;

identify, by a second eBPF FIM machine code, in the kernel space of the second server, the file system mutation action in the kernel space of the second server;

send, by the eBPF FIM machine code in the second server, to a second buffer of the second server, an indication of the second file system mutation action in the kernel space of the second server;

identify, by a second FIM daemon in the user space of the second server, the indication of the second file system mutation action in the kernel space of the second server, wherein the second eBPF FIM machine code runs in the kernel space of the second server based on the second FIM daemon; and send, by the second FIM daemon to the control plane, the indication of the second file system mutation action in the kernel space of the second server.

15. The system of claim 13, wherein the eBPF FIM machine code runs in a sandboxed engine within the kernel space based on the first system call.

16. The system of claim 13, wherein the eBPF FIM machine code defines event-based triggers for reporting file system mutation actions to the buffer, and wherein the eBPF FIM machine code sends the indication of the file system mutation action to the buffer based on the identifying of the file system mutation action as one of the event-based triggers.

17. The system of claim 13, wherein the one or more system file mutation actions occurs in a remotely-mounted network file system.

18. The system of claim 13, wherein the FIM daemon delivers FIM eBPF source code in the user space to the kernel space.

* * * * *